United States Patent
Kurisu et al.

(10) Patent No.: US 8,404,136 B2
(45) Date of Patent: Mar. 26, 2013

(54) METHOD FOR MANUFACTURING DIFFRACTIVE OPTICAL ELEMENT

(75) Inventors: Kenichi Kurisu, Osaka (JP); Hideaki Imamura, Itami (JP)

(73) Assignees: Sumitomo Electric Industries, Ltd., Osaka-shi (JP); Sumitomo Electric Hardmetal Corp., Itami-shi (JP)

( * ) Notice: Subject to any disclaimer, the term of this patent is extended or adjusted under 35 U.S.C. 154(b) by 189 days.

(21) Appl. No.: 12/922,647

(22) PCT Filed: Nov. 13, 2009

(86) PCT No.: PCT/JP2009/069347
§ 371 (c)(1),
(2), (4) Date: Sep. 14, 2010

(87) PCT Pub. No.: WO2010/082398
PCT Pub. Date: Jul. 22, 2010

(65) Prior Publication Data
US 2011/0011831 A1    Jan. 20, 2011

(30) Foreign Application Priority Data
Jan. 19, 2009   (JP) .................................. 2009-008848

(51) Int. Cl.
*C23F 1/00*  (2006.01)
*B44C 1/22*  (2006.01)
(52) U.S. Cl. .............. 216/58; 216/25; 216/67; 438/706; 438/710
(58) Field of Classification Search .................... 216/25, 216/58, 67; 438/706, 710
See application file for complete search history.

(56) References Cited

U.S. PATENT DOCUMENTS

| | | | | |
|---|---|---|---|---|
| 4,422,888 A | * | 12/1983 | Stutius | 117/93 |
| 5,331,657 A | * | 7/1994 | Yoo et al. | 372/46.01 |
| 5,396,103 A | * | 3/1995 | Oiu et al. | 257/744 |
| 2001/0018951 A1 | | 9/2001 | Masuda et al. | |
| 2002/0101663 A1 | | 8/2002 | Kurisu et al. | |
| 2004/0217367 A1 | * | 11/2004 | Kurisu et al. | 257/98 |
| 2006/0110925 A1 | | 5/2006 | Kurisu | |

FOREIGN PATENT DOCUMENTS

| | | |
|---|---|---|
| JP | 2001250815 A | 9/2001 |
| JP | 2002221614 A | 8/2002 |
| JP | 2003332303 A | 11/2003 |
| JP | 2005157344 A | 6/2005 |

OTHER PUBLICATIONS

Ohkawa et al ("Homoepitaxial Growth of p-type ZnSe layers on dry-etched substrates"; Mat. Res. Symp. Proc. vol. 228; 1992 Material Research Society).*

* cited by examiner

*Primary Examiner* — Shamim Ahmed
(74) *Attorney, Agent, or Firm* — Venable LLP; Michael A. Sartori; Tamatane J. Aga

(57) ABSTRACT

There is provided a method for manufacturing a diffractive optical element that can suppress the generation of heat from the inside of an insulative substrate and stabilize an etching rate. A method for manufacturing a diffractive optical element composed of an insulative substrate whose surface has a bumpy structure includes a selecting step of selecting an insulative substrate having an electrical resistivity equal to or higher than a certain value by measuring electrical resistivity of insulative substrates; and an etching step of forming a bumpy structure by dry etching in a surface of the insulative substrate selected in the selecting step.

1 Claim, 3 Drawing Sheets

METHOD FOR MANUFACTURING DIFFRACTIVE OPTICAL ELEMENT

TECHNICAL FIELD

The present invention relates to a method for manufacturing a diffractive optical element.

BACKGROUND ART

Unlike conventional optical elements that use refraction and reflection, diffractive optical elements (DOEs) directly control an optical phase using an optical diffraction phenomenon that occurs at a minute bumpy structure of a surface. DOEs are optical elements that can achieve miniaturization of electronic components or devices which has been increasingly demanded in recent years. Such DOEs are manufactured by dry etching that provides micromachining with high precision.

Dry etching is performed as follows. First, an insulative substrate composed of ZnSe or the like that is a material of optical elements is placed in a chamber. A secondary product is formed through a chemical reaction between the insulative substrate and an activated species in plasma generated when high-frequency power is applied to the insulative substrate. Positive ions also generated in the plasma are made to collide with the secondary product to remove the secondary product. Thus, dry etching is performed.

However, conventional dry etching has a problem in that, when positive ions collide with an insulative substrate or a chemical reaction occurs, the temperature of the insulative substrate is increased and thus the etching rate (speed) is not stabilized. The variation in etching rate leads to the variation in etching depth of the insulative substrate. Consequently, desired performances of DOEs cannot be achieved.

To solve the problem, a dry etching method is proposed in Patent Document 1. In the method, the etching rate is stabilized by attaching an insulative substrate to a conductor through conductive grease, which suppresses the variation in the etching rate between insulative substrates when a plurality of insulative substrates is simultaneously dry-etched.

Citation List
Patent Document
  Patent Document 1: JP2005-157344A

SUMMARY OF INVENTION

Problems to be Solved by the Invention

The variation in etching rate can be improved with the dry etching method disclosed in Patent Document 1. However, the inventors of the present invention have conducted intensive studies and found that, when dry etching is performed using, as a material of optical elements, an insulative substrate having an electrical resistivity equal to or higher than a certain value, the generation of heat from the inside of the insulative substrate is suppressed and the etching rate is stabilized. Thus, the present invention has been completed.

An object of the present invention is to provide a method for manufacturing a diffractive optical element that can suppress the generation of heat from the inside of an insulative substrate and stabilize an etching rate.

Means for Solving the Problems

The present invention provides a method (hereinafter simply referred to as "manufacturing method") for manufacturing a diffractive optical element composed of an insulative substrate whose surface has a bumpy structure, the method including:

a selecting step of selecting an insulative substrate having an electrical resistivity equal to or higher than a certain value by measuring electrical resistivity of insulative substrates; and an etching step of forming a bumpy structure by dry etching in a surface of the insulative substrate selected in the selecting step.

In the manufacturing method of the present invention, the electrical resistivity of insulative substrates are measured, and an insulative substrate having an electrical resistivity equal to or higher than a certain value is dry-etched to form a bumpy structure in the surface thereof. Since insulative substrates with low electrical resistance (electrical resistivity) have many free electrons in a crystal of the insulative substrates, the free electrons vibrate when high-frequency power is applied and thus heat is generated from the inside, which increases the temperature of the insulative substrate. When the temperature is increased, the rate of the chemical reaction between the insulative substrate and the etching gas is increased. As a result, the etching rate is not stabilized. In contrast, since insulative substrates with a large electrical resistivity equal to or higher than a certain value have a small number of free electrons, the generation of heat from the inside can be suppressed even when high-frequency power is applied. As a result, the etching rate can be stabilized. The stabilized etching rate results in a constant etching depth, which provides satisfactory performances of DOEs.

Preferably, the insulative substrate is composed of ZnSe and the certain value is $10^{11}$ Ωcm or higher. ZnSe is dry-etched through a chemical reaction between ZnSe and a highly reactive etching gas that is brought into a plasma state in a high-frequency electric field. The rate of the chemical reaction increases at an accelerated pace as the temperature of ZnSe increases. Therefore, the temperature of ZnSe needs to be a certain temperature or lower during etching in order to achieve a stable reaction rate, but the generation of heat caused by the vibration of free electrons in a crystal can be suppressed by adjusting the electrical resistivity of the insulative substrate composed of ZnSe to $10^{11}$ Ωcm or higher. Consequently, the temperature increase of the insulative substrate is suppressed and the etching rate can be stabilized.

The insulative substrate may be formed by CVD method. In this case, the insulative substrate is a polycrystalline body. Since the insulative substrate has an electrical resistivity of $10^{11}$ Ωcm or higher, the generation of heat caused by the vibration of free electrons in a crystal can be suppressed.

Advantageous Effects of Invention

According to the manufacturing method of the present invention, the generation of heat from the inside of an insulative substrate is suppressed and the etching rate can be stabilized.

DESCRIPTION OF EMBODIMENTS

An embodiment of a manufacturing method of the present invention will now be described in detail with reference to the attached drawings. To make the description clear, the size of components in the thickness direction or the like is exaggerated in FIGS. 1 and 2.

Figure 1:
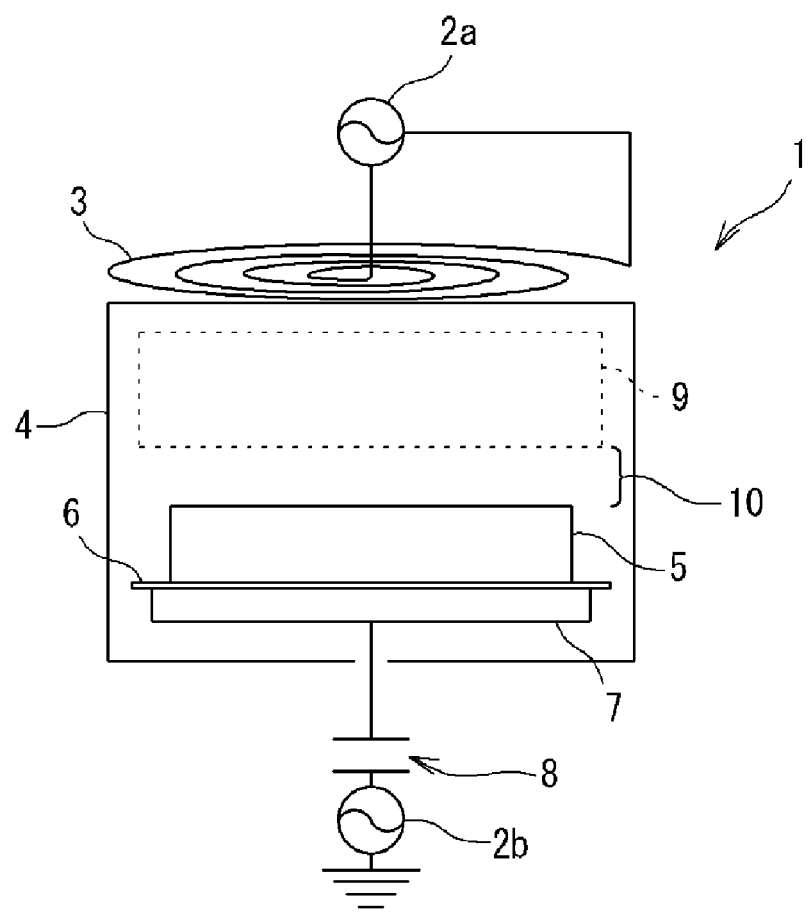
FIG. 1 is an explanatory diagram showing an example of a dry etching apparatus that can be used in the manufacturing method of the present invention.

In the manufacturing method of the present invention, a bumpy structure is formed by dry etching in a surface of an insulative substrate having an electrical resistivity that is equal to or higher than a certain value. For example, the dry etching can be performed using a dry etching apparatus 1 shown in FIG. 1. The dry etching apparatus 1 includes RF power supplies 2a and 2b, an ICP coil 3, and a chamber 4. A conductor 6 to which an insulative substrate 5 that is a raw material of a DOE is attached and an electrode 7 cooled with He gas or the like are disposed in the chamber 4 such that the conductor 6 is electrically brought into intimate contact with the electrode 7. In FIG. 1, a blocking capacitor 8 is disposed between the grounded RF power supply 2b and the electrode 7.

A gas is supplied to the chamber 4, and positive ions in plasma 9 generated through application of high-frequency power using the RF power supplies 2a and 2b collide with a surface of the insulative substrate 5 because of an intense electric field in a sheath region 10 created above the insulative substrate 5. Thus, the insulative substrate 5 is dry-etched.

The dry etching method of the present invention can be performed by using at least one selected from, for example, ICP plasma, CCP plasma, ECR plasma, and NLD plasma. In this case, since fine and highly anisotropic dry etching can be performed, a higher quality DOE can be manufactured. Herein, ICP plasma refers to inductively coupled plasma, which is generated by applying high-frequency power to an ICP coil. CCP plasma refers to capacitively coupled plasma, which is generated through the electrostatic field generated by charges on an electrode. ECR plasma refers to electron cyclotron resonance plasma, which is generated by applying an alternating electric field to positive ions and electrons that are carrying out cyclotron motion in a magnetic field. NLD plasma refers to magnetic neutral loop discharge plasma, which is generated along a loop of magnetic neutral points where the magnetic field is zero.

The type of insulative substrate 5 that can be used in the manufacturing method of the present invention is not particularly limited in the present invention. For example, ZnSe polycrystal synthesized by CVD method, ZnSe single crystal, a group II-VI compound semiconductor such as ZnS or ZnTe, $SiO_2$ such as synthetic quartz or fused quartz, a group III-V compound semiconductor such as GaAs or GaN, or a group IV semiconductor such as Si or Ge can be used. Because ZnSe polycrystal has high transmittivity to infrared light, the DOE composed of ZnSe polycrystal can be suitably used for processing of electronic components or the like with a carbon dioxide gas laser that emits infrared light. Furthermore, the DOE composed of $SiO_2$ can be suitably used for processing of electronic components with a YAG laser (e.g., fundamental wave, second harmonic, third harmonic, or fourth harmonic).

A feature of the present invention is that an insulative substrate having an electrical resistivity that is equal to or higher than a certain value is selected as the insulative substrate 5 and dry etching is performed on the selected insulative substrate 5 to form a bumpy structure in a surface of the insulative substrate 5. The insulative substrate having a large electrical resistivity that is equal to or higher than a certain value has a small number of free electrons. Thus, the generation of heat from the inside is suppressed even when high-frequency power is applied, which stabilizes the etching rate.

The above-described "certain value" varies in accordance with the types of insulative substrate 5. For example, when an insulative substrate is composed of ZnSe, the insulative substrate preferably has an electrical resistivity of $10^{11}$ Ωcm or higher as described below. ZnSe is dry-etched through a chemical reaction between ZnSe and a highly reactive etching gas that is brought into a plasma state in a high-frequency electric field. The rate of the chemical reaction increases at an accelerated pace as the temperature of ZnSe increases. Therefore, the temperature of ZnSe needs to be a certain temperature or lower during etching in order to achieve a stable reaction rate, but the generation of heat caused by the vibration of free electrons in a crystal can be suppressed by adjusting the electrical resistivity of the insulative substrate composed of ZnSe to $10^{11}$ Ωcm or higher.

In the case where the insulative substrate 5 is composed of ZnSe, ZnSe may be formed by CVD method. In this case, the insulative substrate 5 is a polycrystalline body. Since the insulative substrate 5 has an electrical resistivity of $10^{11}$ Ωcm or higher, the generation of heat caused by the vibration of free electrons in a crystal can be suppressed. A ZnSe polycrystal has a high insulating property but is not a complete insulator, thereby having a certain range of electrical resistivity, that is, $10^6$ to $10^{12}$ Ωcm or higher. If the electrical resistivity is lower than $10^{11}$ Ωcm, the etching rate is not stabilized during dry etching and thus the required etching depth precision cannot be achieved. For example, when a DOE for a carbon dioxide gas laser with a wavelength of 10.6 μm is used, etching needs to be performed so as to form depressed portions with a precision of 3.78±0.04 μm in depth. However, if the electrical resistivity is lower than $10^{11}$ Ωcm, it is difficult to achieve the precision within that range.

Figure 2:
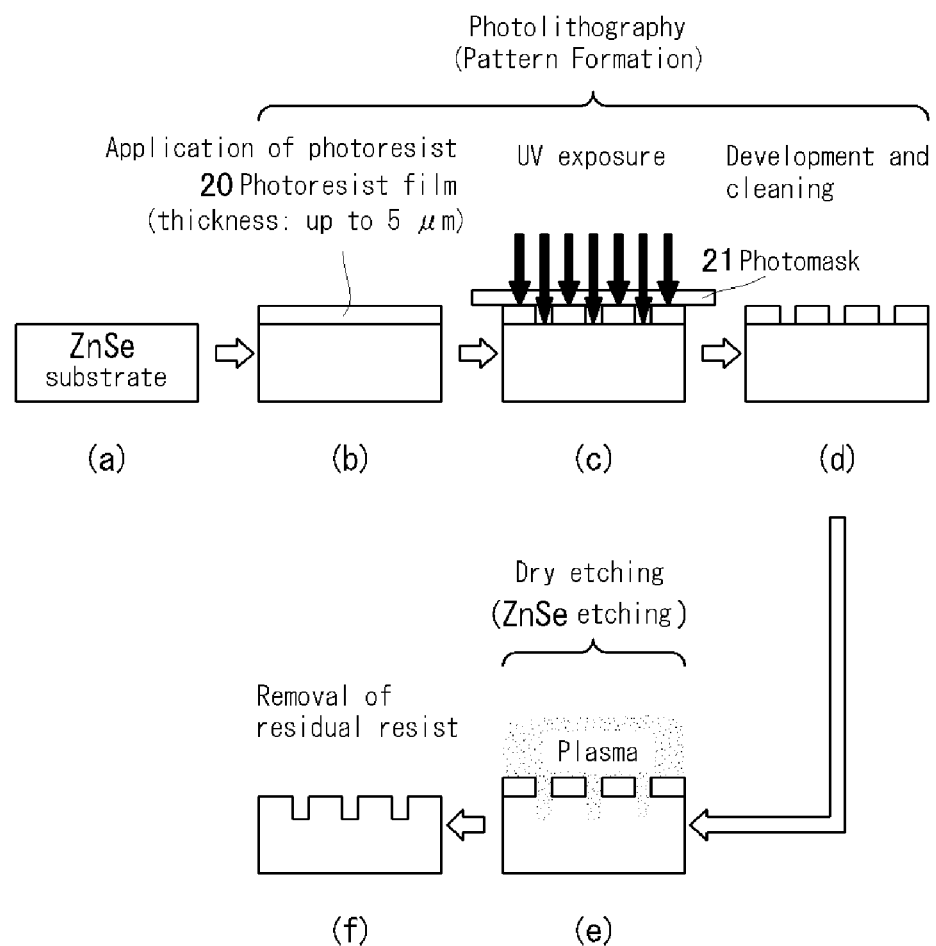
FIG. 2 is an explanatory diagram showing manufacturing steps of a DOE.

Example of the manufacturing method of the present invention will now be described, but the present invention is not limited to Example. DOEs were manufactured by using ZnSe insulative substrates (refer to Table III below) through the following steps. The ZnSe insulative substrates are synthesized by CVD method and have various electrical resistivities. FIG. 2 is an explanatory diagram showing manufacturing steps of a DOE.

[Photoresist Film Formation Step]

Photoresist AZP4620 (trade name, a photoresist available from AZ Electronic Materials) was applied on a disc-shaped insulative substrate 5 (diameter: 50.8 mm, thickness: 5.08 mm) composed of ZnSe using 1H-D2 (trade name, a spin coater available from Mikasa Co., Ltd.). Subsequently, the applied photoresist was heated in a baking furnace in a nitrogen atmosphere to remove the solvent of the photoresist and harden the photoresist. As a result, a photoresist film 20 having a thickness of about 5 μm was obtained (refer to Step (b) in FIG. 2). Table I shows the application conditions and the baking conditions.

TABLE I

| | |
|---|---|
| Application conditions | 4000 rpm (25 sec), 1 sec each for acceleration and deceleration |
| Baking conditions | nitrogen atmosphere, 110° C., 30 min |

[Exposing Step]

A photomask 21 having a two-dimensional pattern that corresponds to a desired bumpy structure was brought into intimate contact with the surface of the photoresist film 20 formed in the above-described step using Q-4000 (trade name, a contact aligner available from Quintel Corporation). The photoresist film 20 was then exposed to UV light (light exposure: 600 mJ at 405 nm) (refer to Step (c) in FIG. 2).

[Pattern Formation Step]

Subsequently, the exposed insulative substrate 5 was shaken at 23° C. for 4 min using AZ-Deveropper (trade name, a developing solution available from AZ Electronic Materials) to develop and remove the exposed portion of the photoresist film 20. After the development, the insulative substrate 5 was cleaned by shaking it in pure water for 2 min. The insulative substrate 5 was then post-baked in a nitrogen atmosphere at 110° C. for 30 min to form a photoresist pattern (refer to Step (d) in FIG. 2).

[Dry Etching Step]

The insulative substrate 5 having the photoresist pattern was dry-etched so as to achieve an etching depth of 3.78 µm. An etching gas was brought into a plasma state in a ICP high-frequency electric field, and etching was performed through a chemical reaction between the etching gas and ZnSe and sputtering (refer to Step (e) in FIG. 2). Table II shows the etching conditions. The etching depth was controlled with etching time. That is, the etching rate was investigated using a previous batch, and the etching time that achieves a depth of 3.78 µm was determined on the basis of the etching rate. Herein, an insulative substrate having an electrical resistivity of $1 \times 10^{11}$ Ωcm or higher was used to investigate the etching rate.

TABLE II

| | |
|---|---|
| ICP power and frequency | 200 W, RF13.56 MHz |
| Bias power and frequency | 300 W, RF13.56 MHz |
| Pressure | 3 Pa |
| Type of etching gas and flow rate | BCl$_3$, 10 sccm |
| | Ar, 20 sccm |
| Etching time | determined from 3.78 µm/(etching rate (µm/min) of previous batch) |

[Photoresist Removing Step]

After the dry etching was completed, the residual photoresist was removed using AZ Remover 200 (trade name, a resist removing solution available from AZ Remover 200 Electronic Materials) (refer to Step (f) in FIG. 2).

Table III shows the relationship between the electrical resistivity of an insulative substrate and the obtained etching depth. It is clear from Table III that the insulative substrates with an electrical resistivity of less than $1 \times 10^{11}$ Ωcm have a remarkably high etching rate and thus desired precision cannot be achieved.

TABLE III

| | Electrical resistivity (Ωcm) | Etching depth (µm) |
|---|---|---|
| Insulative substrates with low resistivity | 1.2E+09 | 3.978 |
| | 7.0E+08 | 4.075 |
| | 6.0E+10 | 3.882 |
| | 2.4E+10 | 3.974 |
| | 2.2E+09 | 3.921 |
| Insulative substrates with high resistivity | 1.9E+12 | 3.785 |
| | 1.8E+12 | 3.817 |
| | 6.7E+11 | 3.784 |
| | 7.8E+11 | 3.765 |
| | 9.0E+10 | 3.806 |

Table IV shows the maximum temperature of a surface of the photoresist film during etching. Temperature was measured using a WAHL Temp Plate Recorder (trade name, a thermolabel available from I.P. LABOLATORIES, Inc.) attached to the surface of the photoresist film while etching was performed under the conditions shown in Table II. The color of a thermolabel changes from gray to black in accordance with temperature and is irreversible once changed. Thus, the maximum temperature can be determined. As is clear from Table IV, insulative substrates with low electrical resistivity have a maximum temperature higher than that of insulative substrates with high electrical resistivity. This may be because insulative substrates with low electrical resistivity have many free electrons, and the free electrons vibrate due to a high-frequency electric field with 13.56 MHz during dry etching and repeatedly collide with a crystal lattice, whereby temperature is increased. The etching reaction of ZnSe proceeds through a chemical reaction and sputtering. Therefore, it is believed that, if the temperature is high, the chemical reaction is facilitated and uncontrollably proceeds, which increases the etching rate and also makes the etching rate unstable.

TABLE IV

| | Electrical resistivity | Temperature |
|---|---|---|
| Insulative substrates with low resistivity | 5.5E8 | 121 to 148° C. |
| | 3.3E9 | 121 to 148° C. |
| Insulative substrates with high resistivity | 4.2E11 | 93 to 131° C. |
| | 5.6E11 | 93 to 121° C. |

Figure 3:
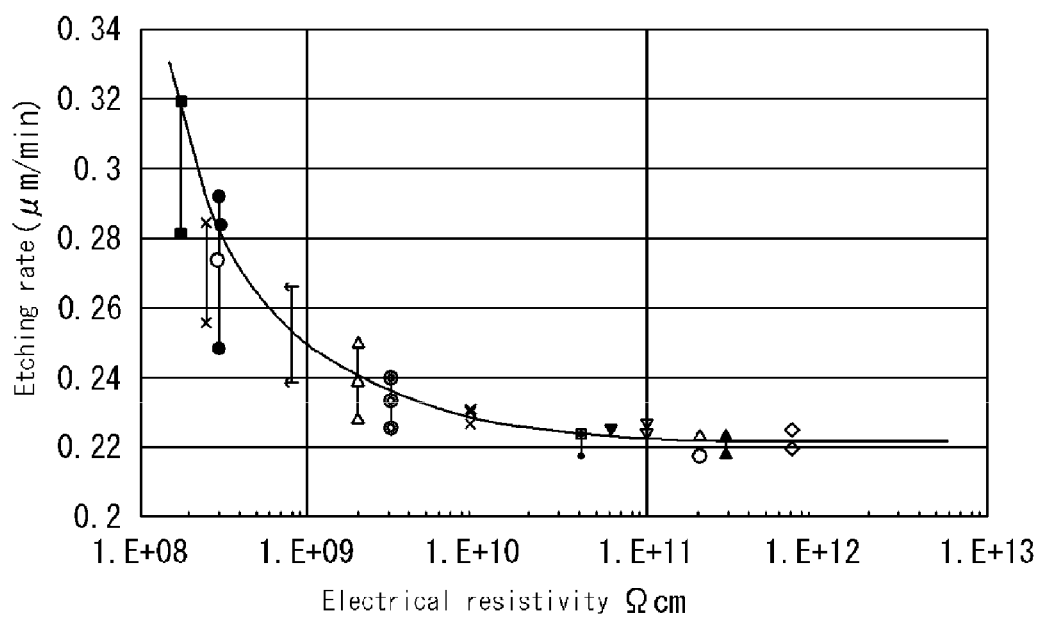
FIG. 3 is a graph showing the correlation between electrical resistivity and etching rate.

FIG. 3 is a graph showing the correlation between electrical resistivity and etching rate. In FIG. 3, the same samples are designated by the same markers. As is clear from FIG. 3, when insulative substrates with low electrical resistivity are etched under the same conditions, the etching rates are significantly different from each other for each etching. In contrast, stable etching rates are achieved for insulative substrates with an electrical resistivity of $1 \times 10^{11}$ Ωcm or higher.

It should be understood that the embodiments disclosed herein are all exemplary and not restrictive. The scope of the present invention is defined by the appended claims but not the embodiments described above, and any modifications can be made within the spirit and scope equivalent to the appended claims.

| Reference Signs List | |
|---|---|
| 1 | dry etching apparatus |
| 2a, 2b | RF power supply |
| 3 | ICP coil |
| 4 | chamber |
| 5 | insulative substrate |
| 6 | conductor |
| 7 | electrode |
| 8 | blocking capacitor |
| 9 | plasma |
| 10 | sheath region |
| 20 | photoresist film |
| 21 | photomask |

The invention claimed is:

1. A method for manufacturing a diffractive optical element composed of an insulative substrate whose surface has a bumpy structure, comprising:
   a synthesizing step of synthesizing ZnSe polycrystalline insulative substrate by CVD method; and
   a selecting step of selecting the ZnSe polycrystalline insulative substrate having an electrical resistivity equal to or higher than $10^{11}$ Ωcm by measuring electrical resistivity of the ZnSe polycrystalline insulative substrate synthesized in the synthesizing step; and
   an etching step of forming a bumpy structure by dry etching in a surface of the ZnSe polycrystalline insulative substrate.

* * * * *